US012693938B1

(12) United States Patent　　　　　(10) Patent No.:　US 12,693,938 B1
Ekbote et al.　　　　　　　　　　　　(45) Date of Patent:　　　Jul. 28, 2026

(54) MULTI-PROTOCOL BACKUP PROXY WITH DDBoost BACKEND

(71) Applicant: Dell Products L.P., Round Rock, TX (US)

(72) Inventors: Omkar Anand Ekbote, Pune (IN); Vikas Jagannath Chaudhary, Pune (IN)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 19/039,120

(22) Filed: Jan. 28, 2025

(51) Int. Cl.
　　*G06F 11/00*　　　(2006.01)
　　*G06F 11/1446*　　(2026.01)
(52) U.S. Cl.
　　CPC ...... *G06F 11/1453* (2013.01); *G06F 11/1464* (2013.01)
(58) Field of Classification Search
　　CPC .................... G06F 11/1453; G06F 11/1464
　　See application file for complete search history.

(56) References Cited

U.S. PATENT DOCUMENTS

| | | | | | |
|---|---|---|---|---|---|
| 10,114,705 | B1 * | 10/2018 | Kumar | ................ | G06F 11/1469 |
| 2017/0235652 | A1 * | 8/2017 | Natanzon | ............ | G06F 11/1453 714/6.3 |
| 2023/0350762 | A1 * | 11/2023 | Mani | ................... | G06F 11/1469 |

* cited by examiner

*Primary Examiner* — Jason B Bryan
(74) *Attorney, Agent, or Firm* — Staniford Tomita LLP

(57) ABSTRACT

A backup process implemented by generating data to be backed up from a file-based application or an object-based application from a respective application host. A generic proxy component collocated with the application host is deployed and contains protocol specific servers and a DDBoost client. The data is transmitted from the application host to the generic proxy using a defined file transfer protocol. The data is then transformed in a protocol specific server of the generic proxy to a format compatible with the DDBoost client, and to leverage distributed segment processing (DSP) to optimize data transfers using the generic proxy. The transformed data is then transmitted to a backup system over a network using a data transmission protocol and the data stored by the backup system in a data storage target.

20 Claims, 7 Drawing Sheets

100

200

202
Data from application

DD Boost Library   204

210                               Data Buffer

212   Segment      A B C A D E C   213

214      Fingerprint

215                    Compress   216

Data Domain   206

218   Filter        A B C D E   220

Write   222

400

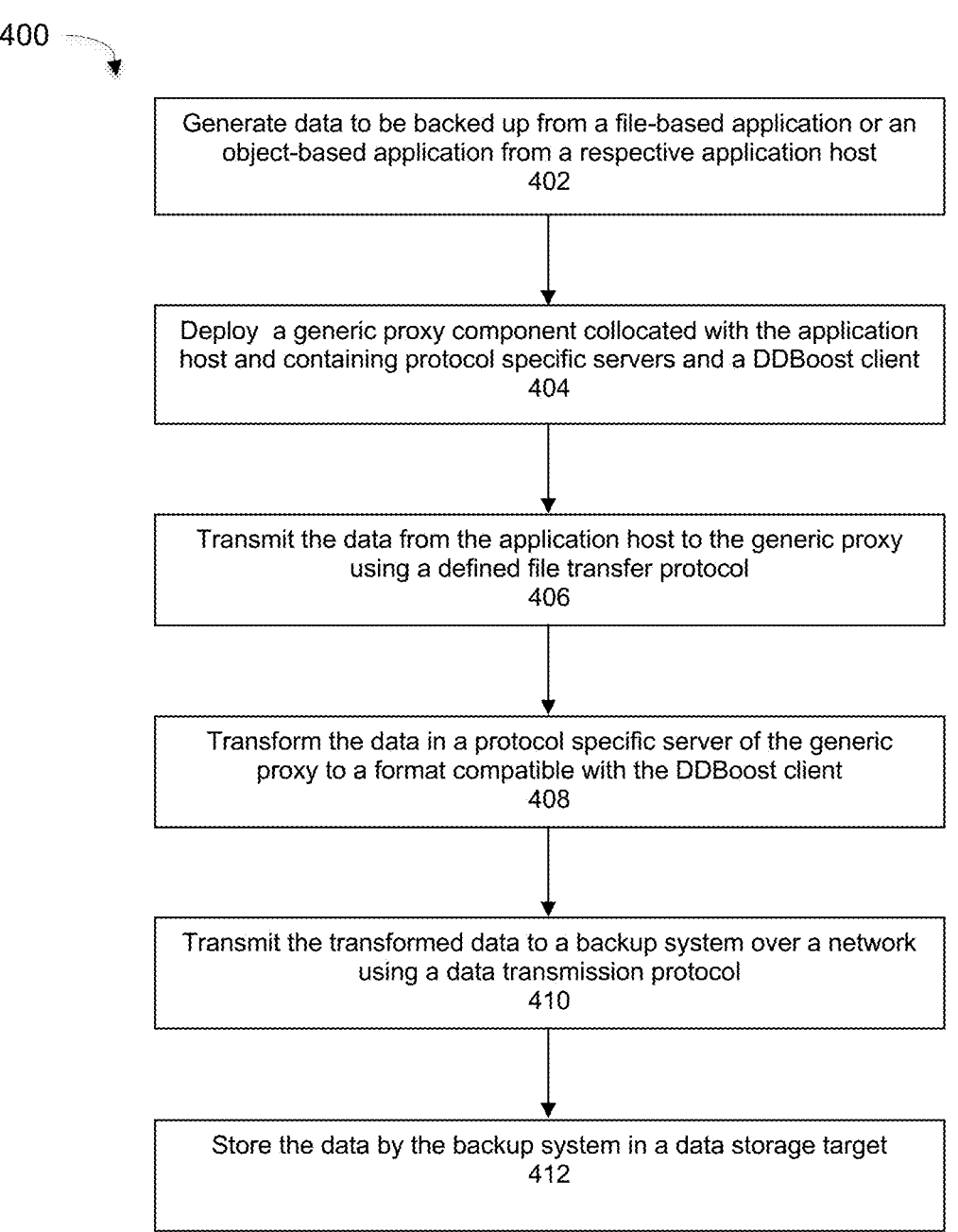

Generate data to be backed up from a file-based application or an object-based application from a respective application host
402

Deploy a generic proxy component collocated with the application host and containing protocol specific servers and a DDBoost client
404

Transmit the data from the application host to the generic proxy using a defined file transfer protocol
406

Transform the data in a protocol specific server of the generic proxy to a format compatible with the DDBoost client
408

Transmit the transformed data to a backup system over a network using a data transmission protocol
410

Store the data by the backup system in a data storage target
412

FIG. 4

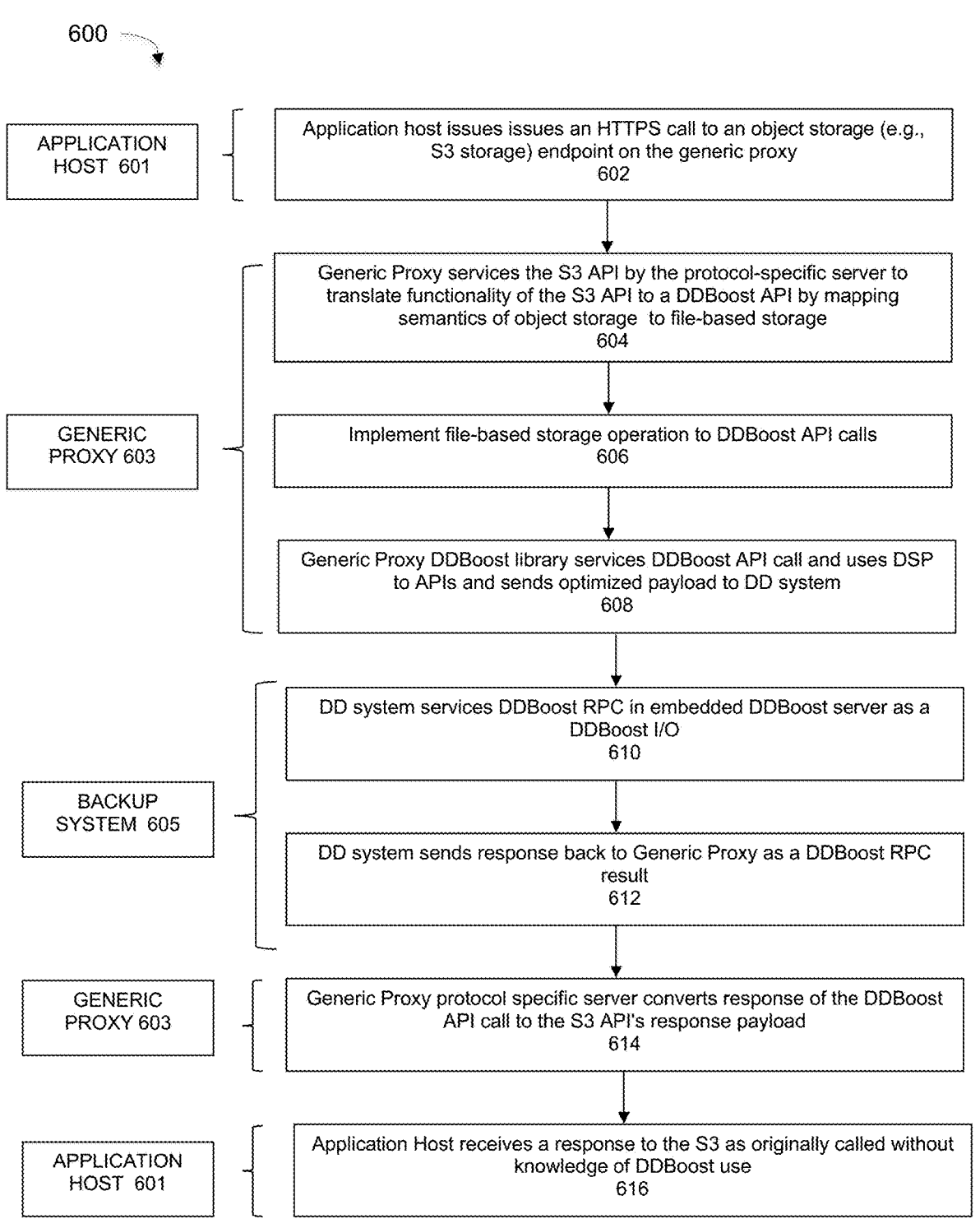

600

APPLICATION HOST 601

Application host issues issues an HTTPS call to an object storage (e.g., S3 storage) endpoint on the generic proxy
602

GENERIC PROXY 603

Generic Proxy services the S3 API by the protocol-specific server to translate functionality of the S3 API to a DDBoost API by mapping semantics of object storage to file-based storage
604

Implement file-based storage operation to DDBoost API calls
606

Generic Proxy DDBoost library services DDBoost API call and uses DSP to APIs and sends optimized payload to DD system
608

BACKUP SYSTEM 605

DD system services DDBoost RPC in embedded DDBoost server as a DDBoost I/O
610

DD system sends response back to Generic Proxy as a DDBoost RPC result
612

GENERIC PROXY 603

Generic Proxy protocol specific server converts response of the DDBoost API call to the S3 API's response payload
614

APPLICATION HOST 601

Application Host receives a response to the S3 as originally called without knowledge of DDBoost use
616

FIG. 6

MULTI-PROTOCOL BACKUP PROXY WITH DDBoost BACKEND

TECHNICAL FIELD

Embodiments relate generally to deduplication storage systems, and more particularly to systems and methods for a multi-protocol backup proxy with DDBoost backend.

BACKGROUND OF THE INVENTION

In data protection system, data is backed up by copying the data from a data source to a data target or storage device. Data deduplication is a form of single-instance storage that eliminates redundant copies of data to reduce storage overhead. Data compression methods are used to store only one unique instance of data by replacing redundant data blocks with pointers to the unique data copy. A popular deduplication system is the Dell Data Domain (DD) platform running the DD file system (DDFS). An application program interface (API) extension is implemented on DDBoost APIs as provided by DellEMC, or any API for similar protocols. The Data Domain filesystem works with a propriety library, called Data Domain Bandwidth Optimized Open Storage Technology (OST), or "DDBoost." This library links with the application to reduce the bandwidth required by data ingests. This method translates the application read and write requests to DDBoost APIs.

Present DDBoost systems attach to applications primarily driven by app-specific "backup agents" that are installed on the application host as a plugin. This plugin takes data from the application and passes it on to the DDBoost library for bandwidth-optimized deduplicated data transfer to a remote DD system. This approach requires implementation of a purpose-built agent for every application. Most applications support backing up their data to an OS-provided mount point which can be a remote filesystem over a standard protocol like NFS, CIFS or S3. Some applications also have native support for standard protocols like S3 for direct backups to remote storage.

What is needed is a method to leverage this capability of applications to backup using standard protocols while also achieving in the benefits of DDBoost before the data is sent to the remote storage, such as a Dell Power Protect Data Domain (PPDM) system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell Technologies, Inc.

BRIEF SUMMARY OF EMBODIMENTS

Embodiments for backing up data generated from a file-based application or an object-based application from a respective application host. A multi-protocol (generic) proxy component collocated with the application host is deployed and contains protocol specific servers and a DDBoost client. The data is transmitted from the application host to the generic proxy using a defined file transfer protocol. The data is then transformed in a protocol specific server of the generic proxy to a format compatible with the DDBoost client. The transformed data is then transmitted to a backup system over a network using a data transmission protocol and the data stored by the backup system in a data storage target.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

FIG. 4 is a flowchart that illustrates a method of implementing a multi-protocol backup proxy with a DDBoost client, under some embodiments.

FIG. 6 is a flowchart that illustrates operations for object-based data from an application to a backup server, under some embodiments.

DETAILED DESCRIPTION

Figure 1:
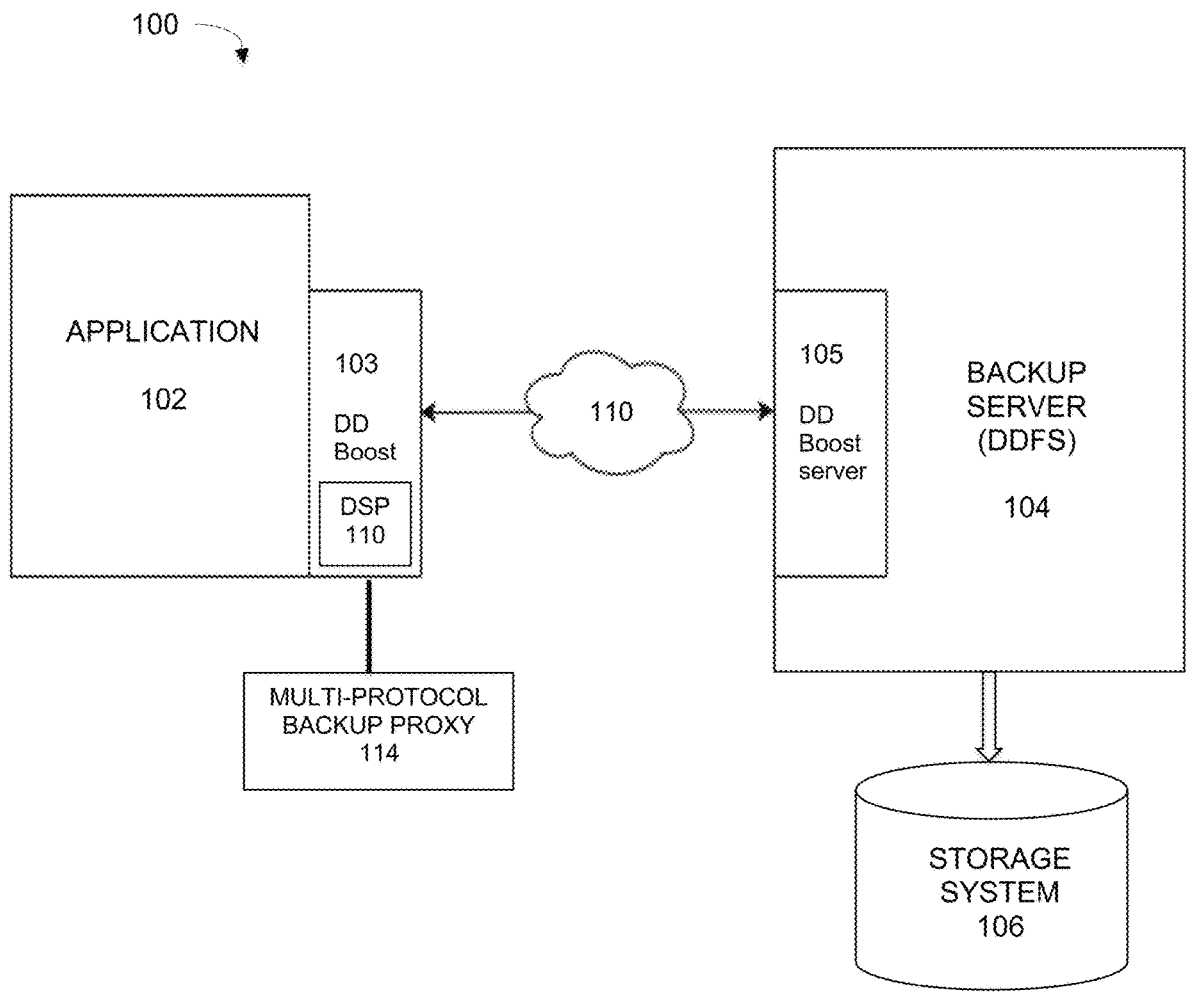
FIG. 1 is a diagram of a computing network implementing DDBoost in a deduplication storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 is a diagram of a data storage system implementing a multi-protocol backup proxy using DDBoost, under some embodiments. System 100 illustrates an example of a large-scale data processing storage system that may comprise a number of server and client computers coupled together in one or more public and/or private networks, each of which may execute one or more applications 102. System 100 includes a backup server 104 that executes a data storage or backup management process that coordinates or manages the backup of data from one or more data sources to storage devices, such as storage system 108 or any other network (primary/secondary) storage, client storage, and/or virtual storage devices that may be provided. These storage devices serve as source storage devices that hold data to be backed up from the one or more data sources, such as database or other application server and client computers.

The application data 102 is sourced by any number of clients, which might be any type of network device, computer, file system, virtual machine, data center, and so on. The data sourced by the clients may be any appropriate data, such as database data that is part of a database management system or any other appropriate application. The backup server 104 causes or facilitates the backup of client data to storage system 106, which may at least be partially implemented through storage device arrays, such as RAID components. System 100 may be implemented to provide support for various storage architectures such as storage area network (SAN), Network-attached Storage (NAS), or Direct-attached Storage (DAS) that make use of large-scale network accessible storage devices, such as large capacity disk (optical or magnetic) arrays. In an embodiment, system 100 may represent a network that includes, among other elements, a Data Domain Restorer (DDR)-based deduplication storage system, such as provided by DellEMC Corporation. However, other similar backup and storage systems are also possible.

In an embodiment, the backup server 104 implements a deduplication backup process as a form of single-instance storage that eliminates redundant copies of data to reduce storage overhead. For deduplication, methods are used to store only one unique instance of data by replacing redundant data blocks with pointers to the unique data copy. As new data is written to a system, duplicate chunks are replaced with these pointer references to previously stored data. To service an input/output (I/O) operation initiated for deduplicated backups, the Data Domain File System (DDFS) must initiate multiple internal I/O operations, such as to lookup LP segment fingerprints, look up indexes, read container metadata, and to read the actual data before servicing the I/O to the backup application. However, the use of pointers greatly reduces the amount of data that needs to be stored.

In an embodiment, system 100 may comprise at least part of a Data Domain Restorer (DDR)-based deduplication storage system, and backup server 104 may be implemented as a DDR Deduplication Storage server provided by Dell Technologies, Inc. In general, Data Domain is a purpose-built backup appliance providing streaming deduplication that ingests data at full network speeds from multiple backup sources while providing storage efficiency. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In an embodiment, the deduplication process may be performed as a server-side process, such as by server 102. Alternatively, the deduplication process may be performed by a distributed deduplication process, such as by a client-side deduplication server 107.

The DDFS system 104 can be configured to work with a propriety library, called Data Domain Bandwidth Optimized Open Storage Technology (OST), or "DDBoost" 103. This library links with the application to reduce the bandwidth required by ingests. This method translates the application read and write requests to DDBoost APIs (application program interfaces). In an embodiment, server 106 implements the DDBoost protocol as a DDBoost server 105 to perform distributed data processing and storage in large data processing and storage systems.

DDBoost is a protocol that performs distributed deduplication of user data sent from a client application 102 to a Data Domain server 104 for persistent storage. With DDBoost, an application 102 calls client library APIs that make remote procedure (RPC) calls to the Data Domain server 104. A client-side library cooperates with server-side code to perform distributed deduplication of user data to minimize the data that is actually sent to the server and to minimize the physical storage required to store the data. The architecture splits DDBoost into separate components, one on the client system and one on the server system. DDBoost is essentially a hybrid process, where some of the deduplication steps occur on the client and some on the server, that is, it represents a distributed deduplication method.

As shown in FIG. 1, for a backup application, client-side DDBoost library 103 interacts through the DDBoost API to the DDFS system 104 through a DDBoost server process 105 over network 103. For an ingest, or restore process, the application 102 issues an open file, which is followed by a series of read or write requests, which are then followed by a file close.

Following is a generic example of a DD Boost API, to open a file and specify the operation, in this case for reading.

boost_open_file (file_path, FLAG=FOR_READING, &file_handle);

This would be followed by read requests:

boost_read(file_handle, offset, length, &buffer);

As shown in FIG. 1, system includes a multi-protocol backup proxy 114 using DDBoost 113 that provides applications to backup data using standard protocols, such as file-based NFS, or object-based S3 protocols to leverage the advantages of DDBoost before sending data to remote storage, 106.

Embodiments of system 100 undergoes include a distributed segment process (DSP) feature 110 of the DDBoost client 102 to optimize data transfers made possible by the generic proxy 114. DSP extends the deduplication workflow normally processed on the data domain system 104 to include the processes for the client to anchor and fingerprint the data segments, and check to see if data is already known to the DD server . . .

Figure 2:
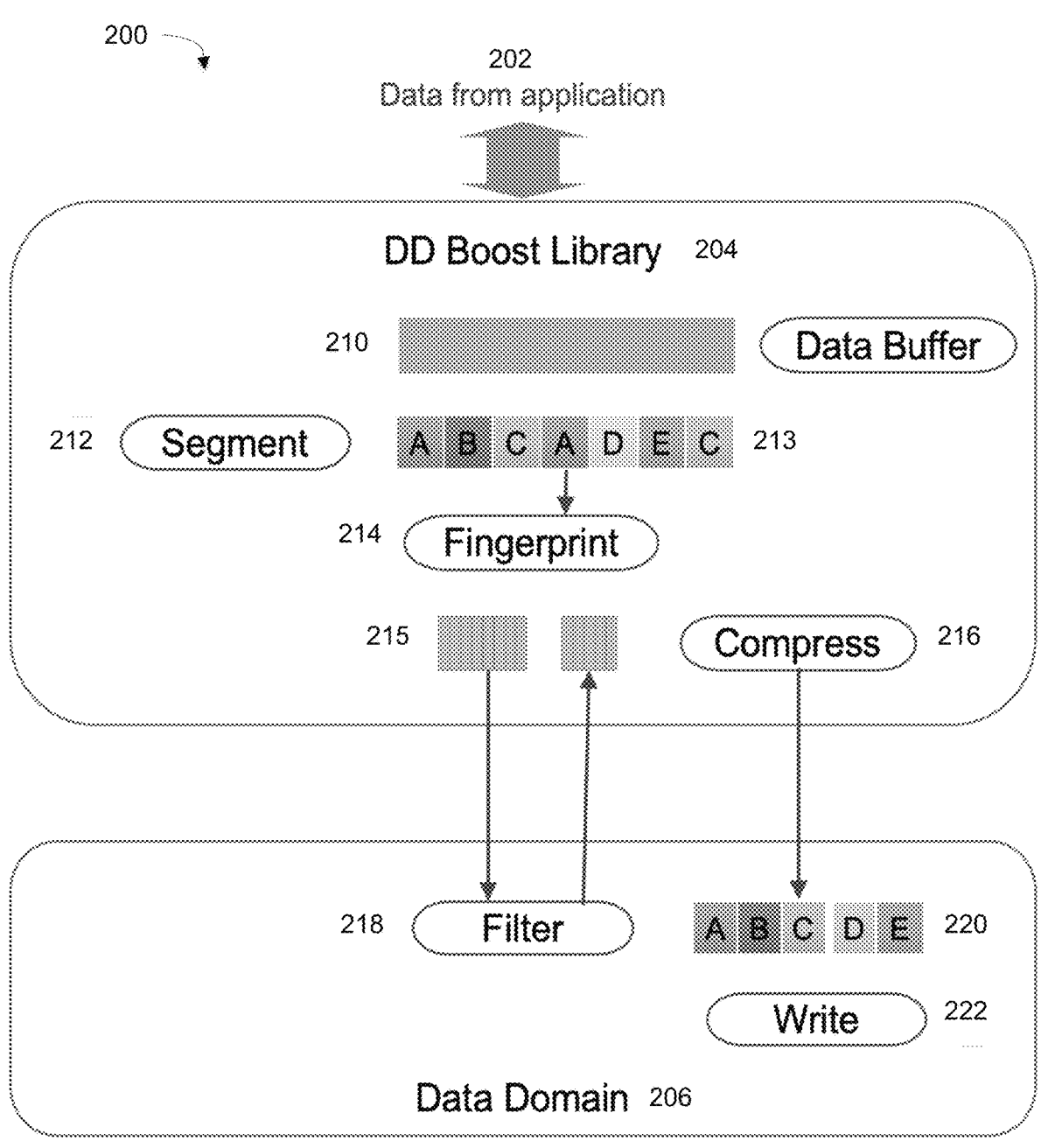
FIG. 2 illustrates operation of a distributed segment process in a DDBoost system, under some embodiments.

FIG. 2 illustrates operation of a distributed segment process in a DDBoost system, under some embodiments. Diagram 200 of FIG. 2 illustrates processing application data 202 between a DDBoost library 204 and a Data Domain system 206. As shown in FIG. 2, data from the application 202 is input to a data buffer 210 of the DDBoost library 204. A segment process 212 transforms the data into segments 213, some of which may include duplicate from other segments, such as the instances of data "A" and "C" in the example dataset "ABCADEC" 213.

In a deduplicated file-system that forms segments from data, these segments are uniquely identified by their key/ label called a fingerprint. In system 200, the data segments are thus fingerprinted 214 to produce fingerprints 215. These are then filtered by a filter process 218 in the DD server 206 and returned back to the DDBoost library 204. The fingerprint data is then compressed 216 in the DDBoost library and transmitted back to the DD server 206 as compressed data 220, which can then be written 222 to storage.

As shown in FIG. 2, the DSP process 200 fingerprints the data segments, compresses and sends only unique data, while the DD side provides filtering of the fingerprints and returns requests for unique data thereby avoiding sending any duplicate data.

Although embodiments are described with respect to deduplication backup systems, embodiments are not so limited. Backup systems not using deduplication methods can also be used with the multi-protocol backup processes and components described herein. Likewise, example embodiments will be described in relation to a Data Domain and DDBoost architecture, however it should be noted that any other server-side, client-side, or distributed deduplication process or system that uses deduplication is also possible, as well as any data storage system that does not use deduplication, as stated above.

Likewise, although FIG. 1 illustrates an example embodiment showing an application 102 and a single server 104 and storage system 106, it should be noted that system 100 may be scaled to any appropriate number of client-server computers, each with their own respective network connections to other internal or external system resources. Thus, system 100 may comprise a number of servers, applications, and storage resources. Likewise, network 110 may be any appropriate network that communicates data between application 102 and server 104, such as any type of LAN, WAN, or Internet network.

Multi-Protocol Backup Proxy with DDBoost

As mentioned above, DDBoost 103 distributes parts of the deduplication process to the backup server or application clients, enabling client-side deduplication for faster, more efficient backup and recovery. A data storage deployment may use any combination of interfaces simultaneously to store and access data. The clients use the DDBoost backup protocol to conduct backups of client data to the appliance pool, restore the backups from the appliance pool to the clients, or perform other data protection operations. The DDBoost library exposes APIs to integrate with a Data Domain system using an optimized transport mechanism. These API interfaces are exported by the DDBoost library to provide mechanisms to access or manipulate the functionality of the DDFS.

In present systems DDBoost attaches to applications through backup agents that are installed on the application host as a plugin, which, at present, requires implementation of a purpose-built agent for every application. Embodiments of system 100 include a multi-protocol backup proxy 114 that provides front-end servers with DDBoost as the backend protocol for I/O to a DD (or similar) system. This proxy essentially services agentless native-protocol backups using a data proxy.

Figure 3:
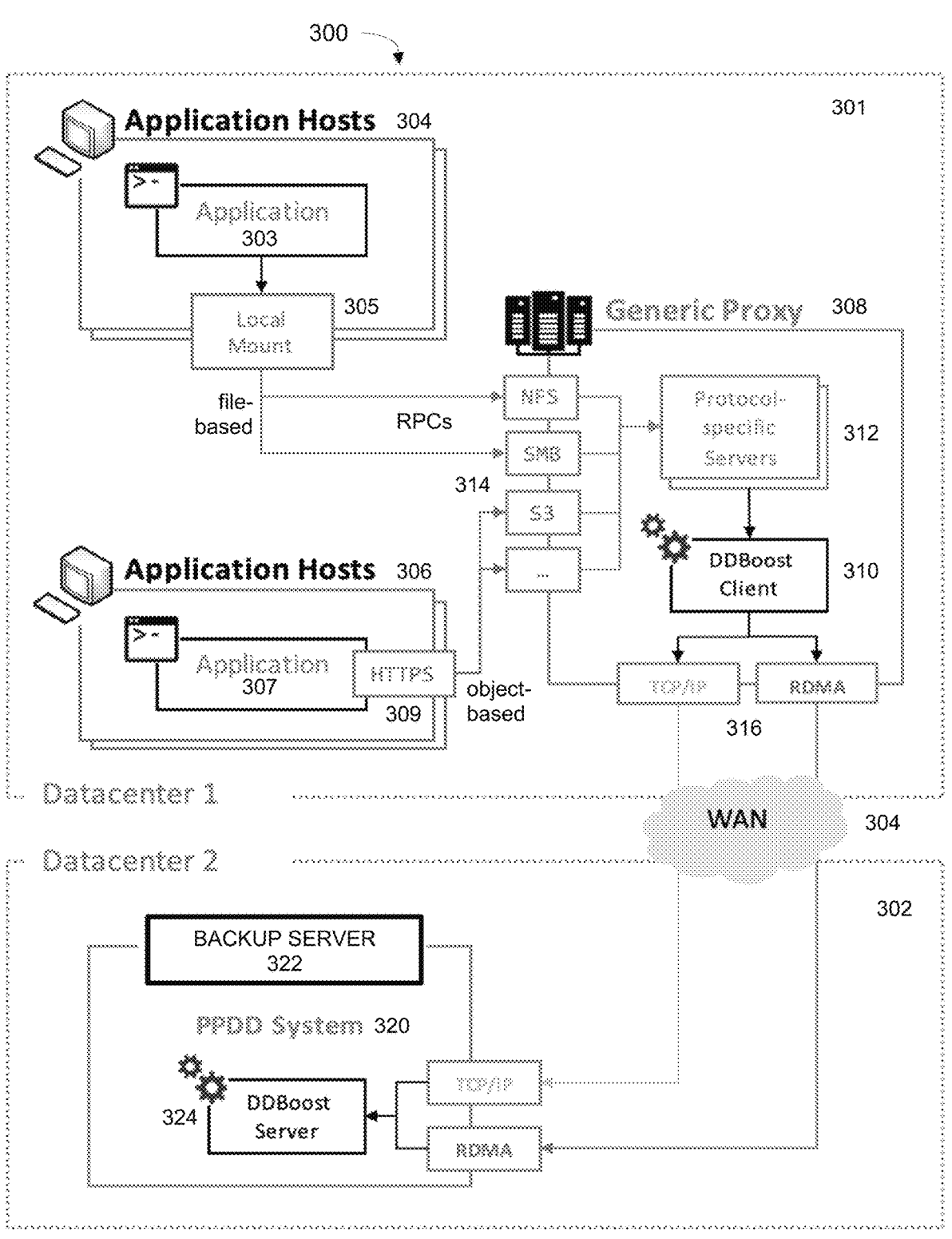
FIG. 3 illustrates an example a multi-protocol backup proxy with DDBoost backend, under some embodiments.

FIG. 3 illustrates an example a multi-protocol backup proxy with DDBoost backend, under some embodiments. System 300 of FIG. 3 comprises a first data center (Datacenter 1) 301 coupled to a second data center (Datacenter 2) 302 over a WAN 304. As shown in FIG. 3, Datacenter 1 represents a backup client system comprising application hosts running applications, and Datacenter 2 is a backup server system.

For the embodiment of FIG. 3, Datacenter 2 is a PPDD system 320 that includes a backup server 322 and DDBoost server 324. The DD system can be a Data Domain scale-out hosted in the same or different datacenter. All traffic to the DD system 320 is transmitted from the application hosts only via the DDBoost protocol in order to gain the benefit of DDBoost, although a direct connection may be possible between the applications and the PPDD system as it supports NFS, etc. as well. For example, standard protocols like NFS/CIFS by themselves over WAN have a major disadvantage in terms of latency and throughput compared to DDBoost, so the same application will see improved performance when connecting to a PPDD system even over standard protocols through the generic proxy 308, compared to non-Boost systems.

As shown in FIG. 3, datacenter 1 contains a number of application hosts, which can be any VM, container or bare-metal component that runs an application. FIG. 3 shows two types of application hosts, where the first type, application host 304 does not use the DDBoost library, but has applications that can benefit from the features that DDBoost provides.

For this embodiment, an application 303 uses a local mount 305 and uses a standard protocol among file sharing protocols 314, such as NFS (Network File System), CIFS (common Internet File System), or SMB (Server Message Block), or any similar standard protocol that allows applications/users to access files on a network server. As DDBoost itself implements file-based semantics and RPCs, applications 303 from hosts 304 are highly compatible with the DDBoost client 310. This allows legacy applications (that are traditionally file-based) to utilize newer DDBoost systems.

The second type of application host 306 produces object-based data, such as those that use the Amazon simple storage service (S3). An S3 implementation facilitates flexible storage and retrieval of any amount of data at any time or location, and an S3 store stores data as objects within buckets, where an object comprises a file and metadata that describes the file. As DDBoost is file-based rather than object-based, these types of applications have up to now not been able to utilizes DDBoost. However, system 300 now allows such object-based applications to fully utilize and benefit from DDBoost. For system 300, a backup from application 307 is triggered by the application itself using either a locally mounted remote storage or direct HTTPS 309 calls to an S3 target.

The multi-protocol, also referred to as a "generic" proxy 308 is a bare-metal/VM/container element that exposes multiple standard protocol servers 312, such as NFS, SMB, S3 to which the application host (of either type) connects. Each standard protocol server has its own implementation that proxies the data and metadata operations to an embedded DDBoost client 310. The protocol specific servers thus implements the standard protocols, such as NFS, CIFS, SMB, and so on.

Normally the backend of a protocol server is a filesystem to convert the received commands to filesystem operations. In system 300, however, the backend is the DDBoost client 310, as shown, where DDBoost has API's that are similar to those of a filesystem. The generic proxy 308 thus hosts standard protocol frontends and translates I/Os to a single DDBoost backend. This effectively allows applications that use standard protocols to leverage DDBoost processing and bandwidth optimized data transfer while being completely agnostic to DDBoost as a plugin. The DDBoost client 310 converts the standard protocol remote procedure calls (RPCs) and converts them into DDBoost remote procedure calls.

In an embodiment, the generic proxy 308 can be implemented in a VM (or similar element) that is collocated with the application or applications, as shown in FIG. 3. Alternatively, it may be provided as a separate network element accessible by the application hosts. In general, the generic proxy would not be located with the backup system 320, as the benefits of DDBoost result from integration or proximity to the applications or backup clients.

The generic proxy implements multiple protocol servers of which one or more can be selectively running and/or disabled. This allows for a single deployment package to support multiple workloads with a runtime configuration change to optimize compute and memory usage. Enabling or disabling individual proxy servers can be performed through specific user input commands or system settings. Each protocol-specific server is a separate process and one or more processes can be spawned based on the configuration of the generic proxy 114.

The output from the applications once processed by the generic proxy 308 is transmitted over WAN 304 to Datacenter 2 where it is then backed up by the PPDD system 320. As shown, the interface 316 to and from the WAN may be over TCP/IP, or in a bare-metal/virtualized form-factor, hardware acceleration technologies such as remote direct memory access (RDMA) can be utilized at a single point without having to reconfigure or reprovision each application host. This will also reduce the performance overhead of the proxy, which constitutes one-hop between the application and the backup server. RDMA generally allows computer to transfer data directly between their memories without any processor or operating system involvement, thus resulting in low latency and high throughput. Any similar interface mechanism may also be used.

FIG. 4 is a flowchart that illustrates a method of implementing a multi-protocol backup proxy with a DDBoost client, under some embodiments. Process 400 of FIG. 4 begins with generating data to be backed up from a file-based application or an object-based application from a respective application host, 402. A generic proxy component collocated with the application host is deployed and contains protocol specific servers and a DDBoost client, 404. The data is transmitted from the application host to the generic proxy using a defined file transfer protocol, 406. The data is then transformed in a protocol specific server of the generic proxy to a format compatible with the DDBoost client, 408. The transformed data is then transmitted to a backup system over a network using a data transmission protocol, 410, and the data stored by the backup system in a data storage target, 412.

As described above, the multi-protocol proxy can adapt both file based protocols (e.g., NFS, SMB) or object-based protocols (e.g., S3) to use DDBoost client 322 and server 324 processes.

Figure 5:
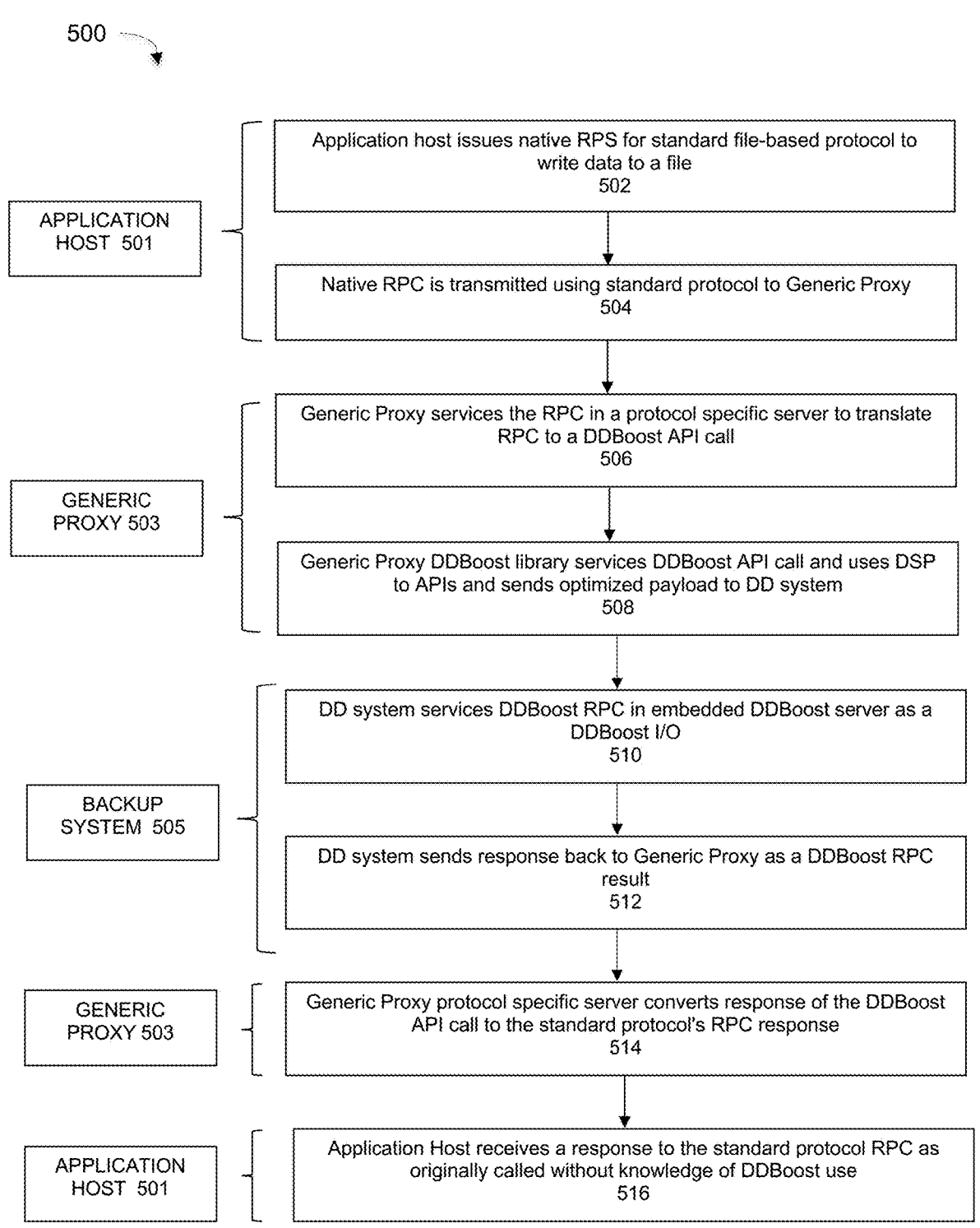
FIG. 5 is a flowchart that illustrates operations for file-based data from an application to a backup server, under some embodiments.

FIG. 5 is a flowchart that illustrates operations for file-based data from an application to a backup server, under some embodiments. Process 500 illustrates the processing of read and write operations for standard protocols such as NFS, SMB, CIFS, and other file-based protocols from an application host 501 to a backup (DD) system 505 through a generic proxy 503. As shown in step 502, the application host 501 issues a native RPC for the standard protocol (e.g., NFSPROC3_WRITE for NFSv3) to write some bytes of data to a file. The native RPC from the application host is then transmitted using the standard protocol (via the OS TCP/IP stack) to the generic proxy 503, step 504.

On the generic proxy 503, the native RPC is serviced by the protocol-specific server, which translates the functionality of the RPC to a DDBoost API call, step 506. For example, NFSPROC3_WRITE will translate to ddp_write( )). The DDBoost library (client) of the generic proxy then services the DDBoost API called by the protocol-specific server and leverages special features of DDBoost, such as Distributed Segment Process (DSP) to applicable APIs. and sends an optimized payload over the wire to the backup system using proprietary DDBoost RPCs, step 508. Depending on the system configuration, these packets may travel over a WAN to a different data center where the DD system is located.

On the backup (DD) system, 505, the DDBoost RPC is serviced by the DDBoost server embedded in the DDFS filesystem and is processed as DDBoost I/O, step 510, and similar to how an application integrated with the DDBoost library would be handled. The DD system is not aware of the standard protocol that the application originally used, and sends a response back to the generic proxy 503 as a DDBoost RPC result, step 512.

On the generic proxy, the protocol-specific server 312 converts the response of the DDBoost API to the standard protocol's RPC response, step 514. The protocol-specific server may call multiple DDBoost APIs and combine the result to be returned as a single RPC response. It may also use a cached or locally computed response to some RPCs without calling any DDBoost API, which would not incur the round-trip cost to the DD system over the WAN. For example, the NFSPROC3_FSINFO RPC in the NFSv3 standard protocol returns static information about the file-system that is not expected to change on the DD system 320.

On the application host 501, the application receives a response to the standard protocol RPC that it originally called and is not aware that DDBoost was used to fetch the response, step 516.

FIG. 6 is a flowchart that illustrates operations for object-based files from an application to a backup server, under some embodiments. Process 600 illustrates the processing of read and write operations for cloud-native protocols such as S3, and other object-based protocols from an application host 601 to a backup (DD) system 605 through a generic proxy 603.

As shown in step 602, the application host 601 issues an HTTPS call to an S3 storage (or other object storage) endpoint on the generic proxy 603. On the generic proxy, the S3 API is serviced by the protocol-specific server (in this case S3), which translates the functionality of the S3 API to a DDBoost API call by mapping the semantics of object storage to file-based storage, step 604. The S3 endpoint translates to a DDBoost Storage-Unit, each bucket translates to a directory, and each object in the bucket translates to a file. Blobs of data are written to or read from the file sequentially. Metadata on the objects is stored as extended named attributes on the file. The resulting file-based storage operation is then implemented as calls to one or more DDBoost APIs, step 606.

Further on the generic proxy 603, the DDBoost library services the DDBoost API called by the protocol-specific server and leverages special features of DDBoost, such as Distributed Segment Process (DSP) to applicable APIs and sends an optimized payload to the PPDD system using proprietary DDBoost RPCs, step 608.

On the DD system 605, the DDBoost RPC is serviced by the DDBoost server embedded in the DDFS filesystem and is processed as DDBoost I/O (again similar to how an application integrated with the DDBoost library would be handled), step 610. The DD system is not aware of the standard protocol that the application originally used, and sends a response back to the generic proxy as a DDBoost RPC result, step 612.

Back at the generic proxy 603, the protocol-specific server converts the response of the DDBoost API to the S3 API's response payload, 614. The server may call multiple DDBoost APIs and combine the result to be returned as a single response.

On the application host 601, the application receives a response to the S3 API that it originally called using HTTPS and is not aware that DDBoost was used to fetch the response, step 616.

Embodiments thus provide a generic approach to support a large variety of applications for which there may not be any native backup agents implemented, and in a manner that is transparent to the application host. The generic proxy is external to the application host, thus simplifying the deployment process without the need to instal any agent on that host. This is in contrast to generic data mover agents that need to be individually installed on possibly thousands of application hosts.

Embodiments provide PPDM support for newer protocols that may be currently unsupported, such as S3. These can be implemented in the proxy using a modern tech stack (e.g., Rust or GoLang) and using open-source frontends, thus speeding up their implementation compared to embedding the server in DDFS.

The generic proxy has a flexible form-factor that can be deployed in bare-metal, virtualized and containerized environments which also allows for cloud-native deployments. It does not have any attached storage, with the only requirement being configuration persistence, and easily lends itself to horizontal scaling.

System Implementation

Embodiments of the processes and techniques described above can be implemented on any appropriate backup system operating environment or file system, or network server system. Such embodiments may include other or alternative data structures or definitions as needed or appropriate. Furthermore, although embodiments are described with respect to a Data Domain backup system, it should be noted that embodiments are not so limited and other deduplication backup and storage systems are also possible.

Figure 7:
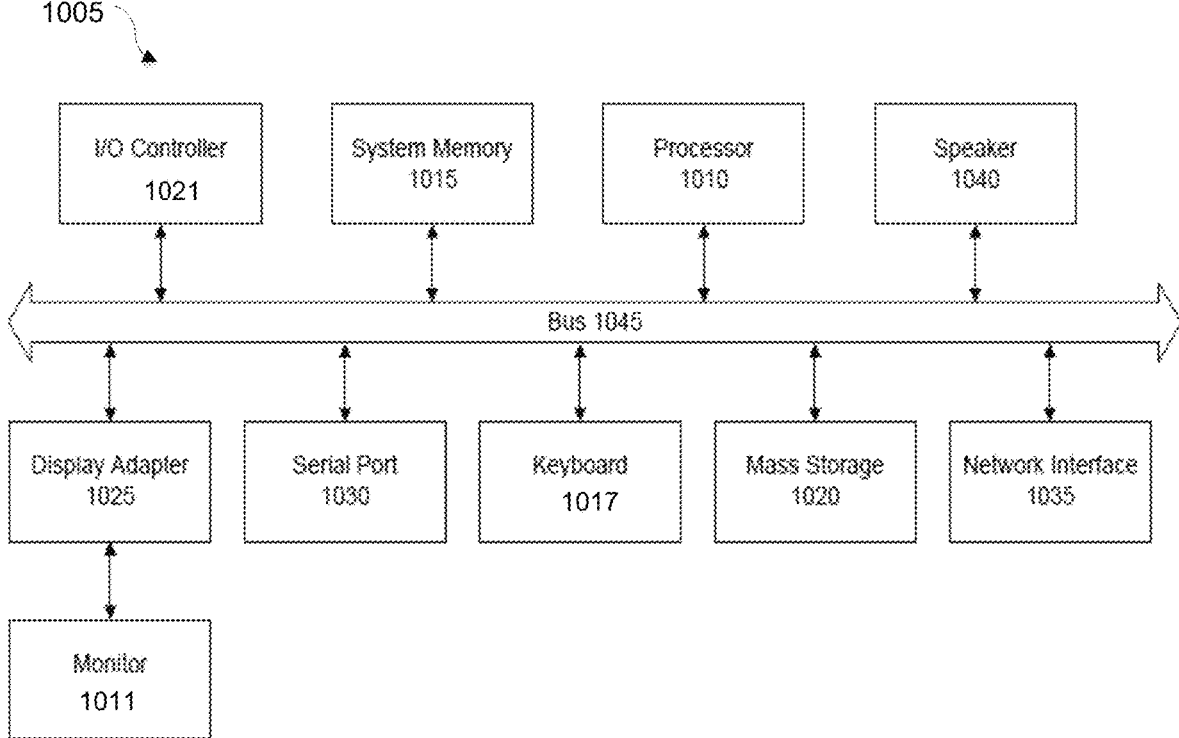
FIG. 7 is a system block diagram of a computer system used to execute one or more software components of the network tuning process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Embodiments can include computer-readable storage medium containing computer-readable instructions or computer program code. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Although certain embodiments have been described and illustrated with respect to certain example network topographies and node names and configurations, it should be understood that embodiments are not so limited, and any practical network topography is possible, and node names and configurations may be used.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of protecting data in a backup system having a backup server and storage, comprising:

generating data from an application hosted by an application host through a defined data transfer protocol;

executing the defined data transfer protocol in a protocol-specific server in a multi-protocol backup proxy functionally coupled to the application host to transform the data into a format compatible with a DDBoost client residing in the multi-protocol backup proxy; and invoking remote procedure calls (RPCs) in the DDBoost client to output the transformed data through a data transmission protocol to the backup system over a network.

2. The method of claim 1 wherein the application comprises one of: a file-based application or an object-based application.

3. The method of claim 2 wherein the defined data transfer protocol for the file-based application comprises a network file system (NFS), common Internet File System (CIFS) or server message block (SMB) protocol, and further wherein the defined data transfer protocol for the object-based application comprises a simple storage service (S3) protocol.

4. The method of claim 3 wherein, for the file-based application, the application host transmits file-based application data through a local mount interface, and further wherein for the object-based application, the application host transmits object-based application data through a HTTPS interface.

5. The method of claim 1 wherein the data transmission protocol to the backup system comprises a TCP/IP interface and a remote direct memory access (RDMA) hardware acceleration process.

6. The method of claim 1 wherein the generic proxy is collocated with the application host in a first data center, and the backup server is maintained in a second data center.

7. The method of claim 6 wherein the backup system comprises a Data Domain deduplication backup system.

8. The method of claim 1 wherein the multi-protocol backup proxy implements a plurality of protocol servers, that can each be selectively disabled to support multiple workloads with a runtime configuration change to optimize system resources.

9. The method of claim 1 wherein the DDBoost client implements distributed segment processing (DSP) to optimize data transfers on the application host side, compressing fingerprinted data and sending only unique data to the backup system.

10. The method of claim 9 wherein the backup system provides filtering of the fingerprinted data and returns requests for unique data thereby avoiding sending any duplicate data to the storage.

11. A system for protecting data in a backup system, comprising:

a processor and memory;

an application host generating data from an application to be transmitted through the backup system to a storage;

a multi-protocol backup proxy functionally coupled to the application host and executing a defined file transfer protocol in a protocol-specific server to transform the data into a format compatible with a DDBoost client residing in the multi-protocol backup proxy; and the DDBoost client invoking remote procedure calls (RPCs) to output the transformed data through a data transmission protocol to the backup system over a network.

12. The system of claim 11 wherein the application comprises one of: a file-based application or an object-based application, and wherein the defined file transfer protocol for the file-based application comprises a network file system (NFS), common Internet File System (CIFS) or server message block (SMB) protocol, and further wherein the defined file transfer protocol for the object-based application comprises a simple storage service (S3) protocol.

13. The system of claim 12 wherein, for the file-based application, the application host transmits file-based data through a local mount interface, and further wherein for the object-based application, the application host transmits object-based data through a HTTPS interface.

14. The system of claim 11 wherein the data transmission protocol to the backup system comprises a TCP/IP interface and a remote direct memory access (RDMA) hardware acceleration process.

15. The system of claim 11 wherein the multi-protocol backup proxy is collocated with the application host in a first data center, and a backup server is maintained in a second data center, and further wherein the backup system comprises a Data Domain deduplication backup system.

16. The system of claim 11 wherein the multi-protocol backup proxy implements a plurality of protocol servers, that can each be selectively disabled to support multiple workloads with a runtime configuration change to optimize system resources.

17. The system of claim 11 wherein the DDBoost client implements distributed segment processing (DSP) to optimize data transfers on the application host side, compressing fingerprinted data and sending only unique data to the backup system, and further wherein the backup system provides filtering of fingerprints for the fingerprinted data and returns requests for unique data thereby avoiding sending any duplicate data to the storage.

18. A computer program product, comprising a non-transitory computer-readable medium having a computer-readable program code embodied therein, the computer-readable program code adapted to be executed by one or more processors to implement a method of protecting data in backup system having a backup server and storage, comprising:

generating data from an application hosted by an application host through a defined data transfer protocol;

executing the defined data transfer protocol in a protocol-specific server in a multi-protocol backup proxy functionally coupled to the application host to transform the data into a format compatible with a DDBoost client residing in the multi-protocol backup proxy; and invoking remote procedure calls (RPCs) in the DDBoost client to output the transformed data through a data transmission protocol to the backup system over a network.

19. The computer program product of claim 18 wherein the application comprises one of: a file-based application or an object-based application, and further wherein the defined data transfer protocol for the file-based application comprises a network file system (NFS), common Internet File System (CIFS) or server message block (SMB) protocol, and further wherein the defined data transfer protocol for the object-based application comprises a simple storage service (S3) protocol.

20. The computer program product of claim 18 wherein the DDBoost client implements distributed segment processing (DSP) to optimize data transfers on the application host side, compressing fingerprinted data and sending only unique data to the backup system, and further wherein the backup system provides filtering of fingerprints for the fingerprinted data and returns requests for unique data thereby avoiding sending any duplicate data to the storage.

* * * * *